3,021,363
PURIFICATION OF BIS-(CARBOXYPHENYL)-
ALKANES BY PERMANGANATE OXIDATION
John C. Petropoulos and Henry F. Lederle, Norwalk,
Conn., assignors to American Cyanamid Company,
New York, N.Y., a corporation of Maine
No Drawing. Filed June 5, 1958, Ser. No. 739,985
6 Claims. (Cl. 260—525)

This invention relates to the purification of bis-(carboxyphenyl)-alkanes produced by the oxidation of the corresponding ditolylalkanes and containing as impurities partial oxidation products and by-products formed during the oxidation reaction. The principal object of the invention is to provide methods suitable for converting partially purified or technical grades of these dicarboxylic acids into more highly refined products free from colored and color-forming impurities and capable of producing alkyd resins and other esterification products of good color.

The bis-(carboxyphenyl)-alkanes purified by the process of the invention are defined by the formula

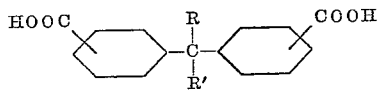

in which R is methyl or ethyl and R' is an alkyl hydrocarbon group containing from 1 to 4 carbon atoms. The preparation of these dicarboxylic acids by the oxidation of the corresponding ditolylalkanes is described in the copending application of John C. Petropoulos, Serial No. 523,355, filed July 20, 1955, now U.S. Patent No. 2,848,486.

The oxidation may be carried out either by the use of chemical oxidizing agents such as chromic acid or nitric acid or by liquid phase oxidation with oxygen or air in the presence of heavy metal catalysts such as cobalt octoate, stearate, linoleate and the like at temperatures above 120° C. and preferably in the range of about 150°–170° C. Although the invention will be described with particular reference to 2,2-butylidene bis-(benzoic acids) prepared by the chemical oxidation of the corresponding ditolylbutanes it will be understood that the principles of the invention are applicable to the purification of any acid of the class defined prepared by any suitable oxidation process when the impure acid is of technical grade and contains oxidizable impurities which would discolor an alkyd resin. Methods for producing 4,4-isopropylidenedibenzoic acid by the oxidation of 2,2-di-(4-tolyl) propane, 4,4'-(2,2-pentylidene) dibenzoic acid by the oxidation of 2,2-di-(4-tolyl) pentane, 4,4'-(3,3-pentylidene) dibenzoic acid by the oxidation of 3,3-di-p-tolyl-pentane and 4,4'-(2,2-butylidene) dibenzoic acid from 2,2-di-(4-tolyl) butane are described in the copending application referred to above and these acids are typical of those included within the scope of the invention.

The ditolylalkanes that constitute the starting materials from which the bis-(carboxyphenyl)-alkanes are produced by oxidation are defined by the formula

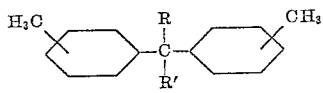

in which R is methyl or ethyl and R' is an alkyl group of from 1 to 4 carbon atoms. The oxidation of these hydrocarbons to the corresponding dicarboxylic acids is ordinarily incomplete and the crude oxidation mixture usually contains at most only about 80–85% of the desired dicarboxylic acid. The remainder of the crude oxidation product may be unoxidized or partially oxidized starting material and oxidation products other than bis-(carboxyphenyl)-alkanes including terephthalic acid, benzophenone dicarboxylic acids resulting from oxidation of the alkane groups and other impurities. When nitric acid is used as the oxidizing agent the crude reaction product also contains nitrated products such as picric acid and other nitro compounds and also nitroso compounds and the like in quantities such that its content of combined nitrogen is ordinarily about 1%. These crude oxidation products are converted into a technical grade of the dicarboxylic acid by repeated extractions with a boiling mononuclear aromatic hydrocarbon solvent such as benzene, toluene or xylene as described in the copending application of John C. Petropoulos, Serial No. 739,983, filed concurrently herewith. It is this technical grade of the bis-(carboxyphenyl)-alkanes that constitutes the starting material for the process of the present invention.

We have found that purified bis-(carboxyphenyl)-alkanes capable of forming alkyd resins of good color can be obtained by first oxidizing the impurities in the above-described acids of technical grade by means of a permanganate oxidation and then separating the acids from solutions of their salts by fractional precipitation. Our invention in its broadest aspects therefore consists essentially in preparing an aqueous solution of the alkali metal or other water-soluble salts of the impure dicarboxylic acids, treating the solution with permanganate and thereby oxidizing the impurities therein to a condition in which they are less highly colored and more soluble in water, and separating the acids in a purified form by careful acidification.

The technical bis-(carboxyphenyl)-alkanes containing impurities which would darken the color of alkyd resins prepared therefrom are preferably converted into their salts by dissolving them in aqueous alkalies such as sodium hydroxide, potassium hydroxide or sodium or potassium carbonate. The resulting solution, preferably containing excess alkali, is treated by adding a permanganate such as sodium or potassium permanganate in a quantity sufficient to oxidize the colored impurities. The optimum quantity of permanganate will vary with the quantity of impurities present but with solvent-extracted acids of reasonably good grade will ordinarily be within the range of about 2–8% on the weight of the impure acids as starting materials. In most cases a quantity within the range of about 4–6% is preferred. In order to accelerate the oxidation the aqueous organic acid salt solution is preferably heated to boiling and the permanganate added slowly and with agitation. When all of the permanganate has been added the heating is preferably continued until the permanganate color has disappeared and the resulting manganese dioxide is removed by filtration, thus ensuring that the purified acids will be free from manganese compounds which are undesirable in alkyd resins. If desired a small quantity of sodium bisulfite or other reducing agent may be added to accelerate the reduction of any residual permanganate to manganese dioxide. The solution may then be neutralized to precipitate the purified acids or decolorizing carbon or other adsorbent may first be added if desired. The advisability of adding decolorizing carbon, as well as the amount to be used, will depend primarily on the type and amount of impurities in the organic acids being treated.

After oxidation of the impurities by the above procedure the purified bis-(carboxyphenyl)-alkanes are recovered by acidifying the aqueous salt solutions with an acid such as sulfuric acid, acetic acid, hydrochloric acid, sulfurous acid and the like. The acidification is carried to a pH of from about 5 to about 6, within which range most of the alkylidene bis-benzoic acids are precipitated. Substantially colorless acids capable of producing alkyd resins having a color of about 3–4 on the Gardner-Holdt scale can be obtained when the acidification is carried to a pH not lower than 5.0 and all of the precipitated acids are recovered together, but it is frequently advantageous to precipitate and recover two or more portions of the acid separately. Thus, for example, a minor fraction containing up to about 10% of the organic acids may first be removed after stopping the acidification at about 5.7–6.1, the exact value depending on the concentration of the organic salt solution, the rate of acid addition and thoroughness of agitation and other operating conditions. This fraction sometimes contains small quantities of color producing impurities. The acidification is then continued down to about 5 or slightly lower or higher whereupon the main fraction of the bis-(carboxyphenyl)-alkane is precipitated and can be recovered in a highly purified condition by filtration and washing.

As has been indicated above the process of our invention is particularly applicable to the butylidene bis-(benzoic acids) of which 2,2-butylidene bis-(p-benzoic acid) is an illustrative and preferred material. This acid in a purified condition is important because it can be prepared in quantity by the procedures hereinafter described and produces alkyd resins having outstanding chemical resistance, toughness and impact resistance. Freedom from color is, however, an important requirement of surface coating resins such as fatty acid modified alkyd resins prepared from this and similar acids, and therefore it is very important to obtain an acid having a low content of colored or color-forming impurities. A 2,2-butylidene bis-(p-benzoic acid) purified by the process of our invention is of importance because color-forming impurities which would darken alkyd resins or other esters are oxidized by the permanganate treatment and purified acids are separated from the oxidation products by the fractional precipitation.

The preparation and purification of representative bis-(carboxyphenyl)-alkanes in accordance with the process of the invention are further described and illustrated in the following examples. In these examples the degree or extent of purification of the acid is shown by the color of a representative fatty acid-modified alkyd resin of the type used in preparing lacquers and other surface coatings, which is prepared by the following procedure. A test tube equipped with an air condenser is charged with 1.5 grams of lauric acid, 1 gram of glycerine and 2 grams of the bis-(carboxyphenyl)-alkane under test together with sufficient xylene to remove all of the water evolved by azeotropic distillation and to maintain the reactants at 220°±4° C. The reactants are heated until the evolution of water is complete; usually about 2 hours are required. The resulting alkyd resin is cooled and dissolved in xylene to 50% solids.

The color of the resin solution is compared with the standard Gardner-Holdt color scale and the results are reported by the customary procedure, in which a color number followed by a minus sign is slightly better (lower) than the number of the standard while a plus sign indicates that it is slightly poorer. A color half way between the two standards is indicated by a hyphen between the two numbers; e.g., 2–3.

It will be understood that although the examples may describe certain of the more specific features of the invention they are to be considered as illustrative and not as limiting the invention in its broader aspects, and that modifications and substitutions of equivalents may be resorted to within the scope of the appended claims.

*Example 1*

An autoclave is charged with 105 parts of 1,1-di-(p-tolyl) ethane, 5 parts of metallic sodium and 1.5 parts of o-toluic acid, purged with nitrogen gas and sealed. It is then heated to about 170° C., and the pressure is released, and 11.8 parts of ethylene are introduced; the pressure is then about 900 p.s.i. The temperature is maintained at about 170° C. with intermittent additions of ethylene until no further pressure drop is noted, which requires about 6 hours, after which it is cooled. The reaction products are removed, filtered, washed with hexane and distilled. The distillate is a 2,2-di-(p-tolyl) butane having a purity of about 99.5%.

A portion of this material amounting to 69.6 parts by weight is introduced into an autoclave previously charged with 440 parts of 25% nitric acid. The autoclave is heated to about 150° C. and maintained under a pressure of about 200 p.s.i.g. or higher by gradual addition of the di-(p-tolyl) butane; the gas which is vented off contains CO, $CO_2$ and oxides of nitrogen. When the reaction is completed the solid oxidation product is filtered off and washed with water. The resulting crude product contains about 80% by weight of 2,2-butylidene bis-(p-benzoic acid) together with other oxidation products including small quantities of terephthalic acid and benzophenone dicarboxylic acids and nitro and nitroso compounds. This crude is suspended in twice its weight of toluene which is then boiled with agitation under a reflux condenser for four hours, and filtered. The solid product on the filter is again suspended in twice its weight of toluene and heated at reflux for four hours and recovered by filtration. The dried solids constitute a technical grade of 2,2-butylidene bis-(p-benzoic acid) which is largely free from nitrogen compounds but contains substantial quantities of colored and color-forming impurities.

*Example 2*

A portion of the product of Example 1 was dissolved in an aqueous sodium hydroxide solution which was then heated to boiling and treated by the addition of 4.4% of potassium permanganate, based on the weight of the impure organic acid, using the procedure described in Example 3. The treated solution was boiled until the permanganate color had disappeared and was then saturated with sulfur dioxide at 80° C. The acidification with sulfur dioxide was continued to a pH of 5.0 at which the precipitated acid was recovered by filtration, washed with hot water and dried. The yield was 93.4% based on the technical grade dicarboxylic acid. The color of an alkyd resin prepared from the purified acid was 3–4 on the Gardner-Holdt scale.

*Example 3*

A 500 gram portion of a toluene-extracted technical 2,2-butylidene bis-(p-benzoic acid) was agitated in a solution of 162 grams of NaOH in 2 liters of pure water. The resulting salt solution was heated to boiling and 20 grams of potassium permanganate were added slowly and with agitation after which it was boiled under a reflux condenser for 2.5 hours and then cooled and filtered. The resulting yellow solution was diluted to 10% solids, 100 grams of decolorizing carbon ("Darco G-60") were added and the slurry was heated to boiling, cooled and filtered. The filtrate was heated to 80° C. and sulfur dioxide was introduced with agitation until the pH reached 5.6. At this point about 9 grams of the organic acid had precipitated; this was removed by filtration and dried. Additional sulfur dioxide was introduced into the filtrate until the pH reached 5.3 whereupon the main portion of the purified acid was filtered off, washed with hot water and dried. It weighed 302 grams and produced an alkyd resin having a color of 2+ on the Gardner-Holdt scale. Further addition of sulfur dioxide to a pH of 4.8 resulted in the precipitation from the filtrate of an additional 91 grams of purified acid which after filtration and drying formed an alkyd resin having a color of 3–. A last fraction weighing 16 grams was obtained by acidifying the filtrate to a pH of 3.2; this contained the bulk of the color producing impurities along with terephthalic acid.

*Example 4*

A 50 gram portion of the product of Example 1 was added to a solution of 20 grams of NaOH in 430 grams of water, heated to boiling and oxidized by the addition of 2 grams of potassium permanganate. Excess permanganate was then decomposed by the addition of sodium bisulfite after which the solution was diluted to 10% solids, treated with decolorizing carbon and filtered. The filtrate was saturated with sulfur dioxide to a pH of 5.7 and the liberated acid was filtered off, washed and dried. It weighed 9.25 grams and produced an alkyd resin having a color of 5–6. Upon further acidification of the filtrate to a pH of 5.2 there was obtained 30 grams of a purified acid which formed an alkyd resin having a color of 3–4.

*Example 5*

An autoclave was charged with 238 parts by weight of 2,2-di(p-tolyl) propane, 306 parts of concentrated nitric acid and 610 parts of water and heated to 160° C. The reaction mixture was held at 170°–190° C. for 30 minutes and was then cooled to room temperature. The oxidation product was recovered by filtration and washed with water.

A 707 gram portion of the crude isopropylidene bis-(p-benzoic acid) obtained by this procedure was suspended in 1640 grams of toluene and the mixture was refluxed for one hour, cooled and filtered. The solid residue after washing with toluene and drying weighed 641 grams.

A solution of 200 grams of NaOH in 2 liters of water was prepared and 500 grams of the toluene-extracted isopropylidene bis-(p-benzoic acid) was added and dissolved by heating with agitation. The resulting solution was maintained at its boiling point while 51 grams of potassium permanganate were added slowly. Boiling was continued for an additional 10 minutes after which small amounts of sodium bisulfite were added carefully until the last traces of permanganate color had disappeared and the solution was then cooled and filtered. The filtrate was treated by adding 200 grams of decolorizing carbon (Darco G–60) and then heated to boiling, cooling and filtering. The filtrate was saturated with sulfur dioxide at 80° C. and the sulfur dioxide addition was continued until a main fraction of the purified acid was precipitated. This was filtered off and washed with water; after drying it weighed 222 grams and produced an alkyd resin having a color of 4. A second fraction of the organic acid was obtained by further acidification of the filtrate with sulfur dioxide; this weighed 135 grams and formed a darker alkyd resin having a color of 6–7.

*Example 6*

An autoclave was charged with 306 parts by weight of concentrated nitric acid in 610 parts of water and 252 parts of 3,3-di-p-tolylpentane were added. The mixture was heated with agitation for one hour and then cooled and the resulting crude 4,4'-(3,3-pentylidene) dibenzoic acid was recovered by filtration. The product was suspended in twice its weight of toluene and the suspension was boiled for one hour under a reflux condenser and then cooled and filtered. The filter cake was again boiled in toluene and the purified material was recovered by filtration and dried.

A portion of the dried product weighing 700 grams was dissolved in aqueous sodium hydroxide solution which was heated to boiling and treated with 42 grams of potassium permanganate. Boiling was continued until all of the permanganate color had disappeared after which the solution was filtered, heated with 50 grams of decolorizing carbon, and acidified with sulfur dioxide as described in Example 2 until the purified acid was precipitated. An alkyd resin prepared from a portion of this product had a color of 3–4 on the Gardner-Holdt scale.

What we claim is:

1. A method of purifying an impure alkylidene bisbenzoic acid of the formula:

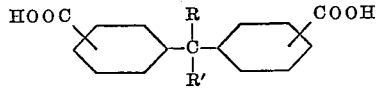

wherein R is an alkyl radical of from 1 to 2 carbon atoms and R' is an alkyl radical containing from 1 to 4 carbon atoms, said acid being obtained by nitric acid oxidation of a compound of the formula:

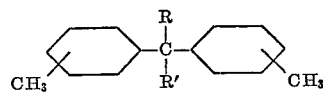

wherein R and R' are the same as defined above, followed by the solvent-extraction of the resultant alkylidene bis-benzoic acid with a mononuclear aromatic hydrocarbon selected from the class consisting of benzene, toluene and xylene to recover an alkylidene bis-benzoic acid together with small quantities of terephthalic acid, benzophenone dicarboxylic acids, picric acid and other unidentified impurities which darken the color of alkyd resins prepared from such impure alkylidene bis-benzoic acid, which consists essentially in the steps of: converting said solvent-extracted bis-benzoic acid to the corresponding alkali metal salt in an aqueous medium, oxidizing the latter mixture by adding thereto from about 2% to about 8% of an alkali metal permanganate based on the weight of the alkylidene bis-benzoic acid being so-treated, heating said mixture and removing any insolubles formed, and thereafter recovering a purified alkylidene bis-benzoic acid substantially free from the hereinabove stated impurities by acidifying the latter solution to a pH of between about 5 and 6, thereby precipitating said purified alkylidene bis-benzoic acid.

2. A method according to claim 1, in which the impure bis-benzoic acid is a 2,2-butylidene bis-(p-benzoic acid).

3. A method according to claim 1, in which the impure bis-benzoic acid is isopropylidene bis-benzoic acid.

4. A method according to claim 1, in which the impure bis-benzoic acid is a pentylidene bis-benzoic acid.

5. A method according to claim 1, in which the alkali metal permanganate is potassium.

6. A method according to claim 1, in which the permanganate is present in amounts between about 4% and 6%.

References Cited in the file of this patent

UNITED STATES PATENTS

| 1,692,927 | Calcott et al. | Nov. 27, 1928 |
| 2,154,626 | Koch | Apr. 18, 1939 |
| 2,879,288 | Grosskinsky et al. | Mar. 24, 1959 |

FOREIGN PATENTS

| 965,231 | Germany | June 6, 1957 |